UNITED STATES PATENT OFFICE.

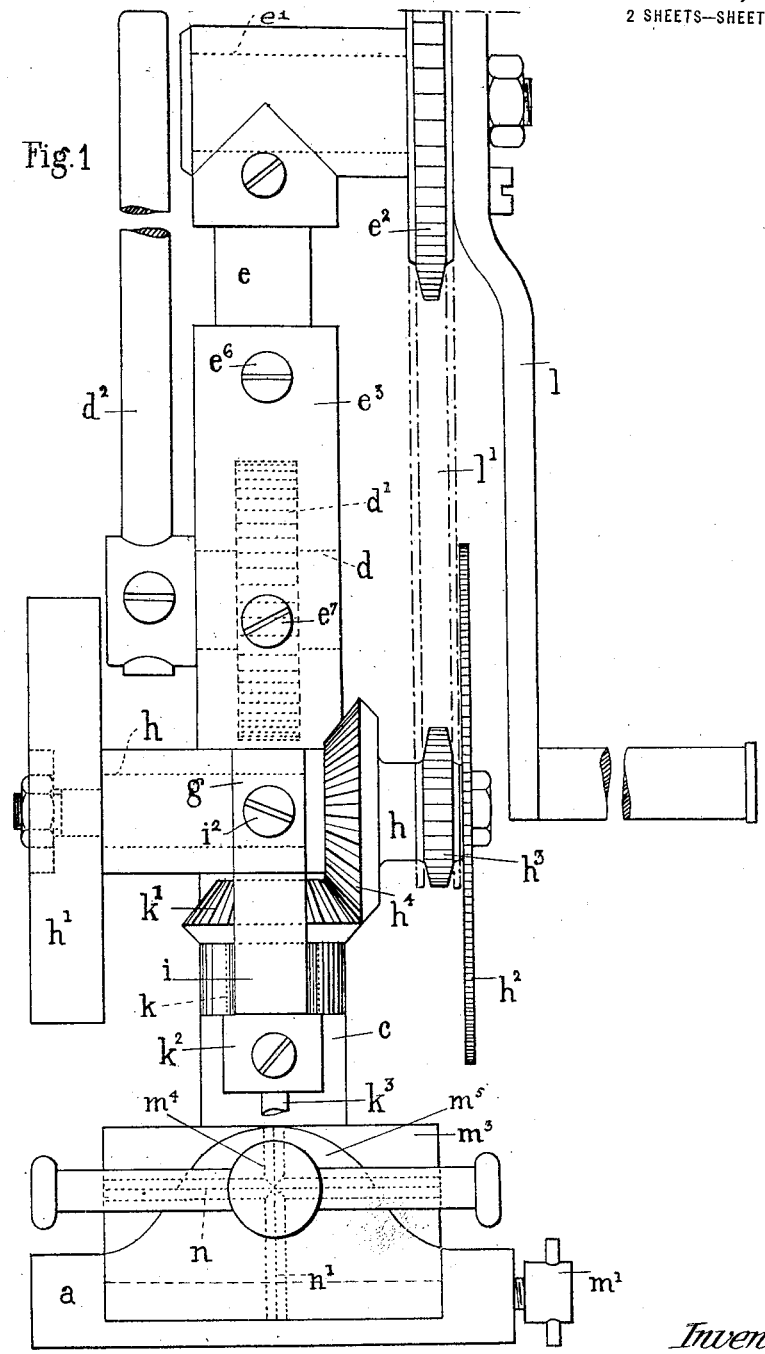

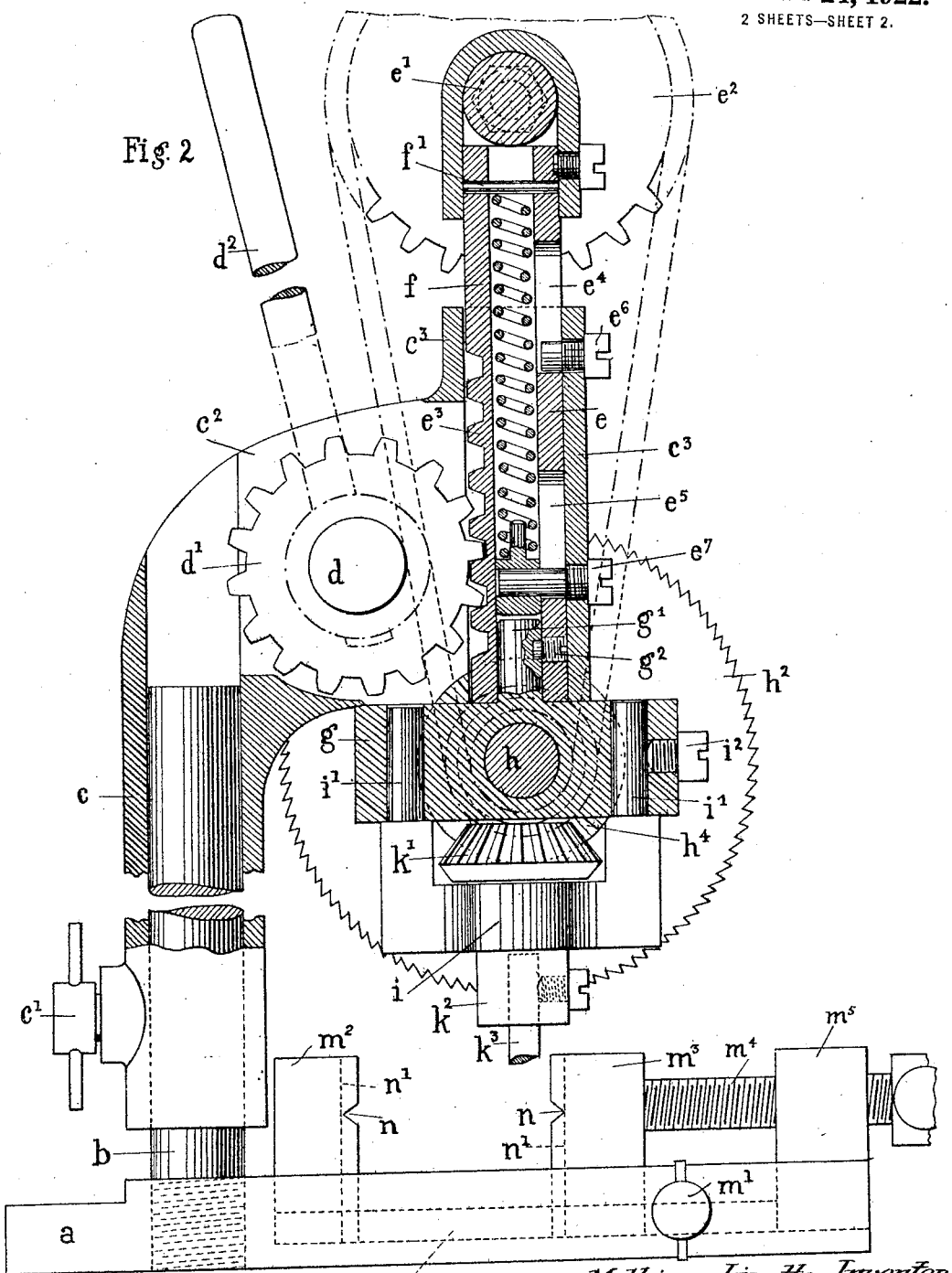

MATHIEU LINOTTE, OF PARIS, FRANCE, ASSIGNOR TO COMPAGNIE MANUFACTURIERE MARCALEX, OF PARIS, FRANCE.

UNIVERSAL HAND-OPERATED MACHINE TOOL.

1,404,533.

Specification of Letters Patent. Patented Jan. 24, 1922.

Application filed May 4, 1916. Serial No. 95,501.

*To all whom it may concern:*

Be it known that I, MATHIEU LINOTTE, a citizen of the French Republic, residing at Paris, France, have invented certain new and useful Improvements in Universal Hand-Operated Machine Tools, of which the following is a specification.

This invention relates to a universal hand operated machine tool, that is to say one by which various operations such as drilling, grinding, sawing, and the like can be efficiently carried out.

The machine tool according to the invention is characterized in that the driving mechanism for rotating the various tools participates in the rising and falling movements of the tools.

One form of machine tool according to the invention is illustrated by way of example in the accompanying drawings in which—

Figure 1 is a front elevation.

Figure 2 is a side elevation, partly in section.

Upon a base plate $a$, which may be fixed on a bench in any suitable manner, is mounted a column $b$, upon which the body $c$ may be fixed in any position whatever by means of a set screw $c'$ or otherwise. This body, cylindrical at its lower part, comprises, at its middle part, two cheeks $c^2$, between which is mounted upon a shaft $d$, a sector or toothed pinion $d'$ operated by a lever $d^2$, situated outside the body $c$. The upper cylindrical part $c^3$ of the body is hollow and surrounds a tube $e$, carrying at its upper part a shaft $e'$ on which is mounted a sprocket pinion $e^2$. The tube $e$ on one side is cut with rack teeth $e^3$, meshing with the toothed pinion $d'$, and is slotted at $e^4$, $e^5$, on the opposite side to the rack. Screws $e^6$, $e^7$, pass through the cylindrical part $e^3$ and engage within these slots, guiding the tube $e$, within the cylinder $e^3$. The lower screw $e^7$ is extended into the interior of the tube $e$ and forms an abutment for a coiled spring $f$, maintained at its upper part by a pin $f'$. A piece $g$ is fixed to the body, by the intermediary of a nipple $g'$, held inside the hollow cylindrical part $c^3$, of the body by a headless screw $g^2$, or in any other suitable manner. The piece $g$, supports a shaft $h$, carrying a grinding wheel $h'$, a circular saw $h^2$, a small sprocket pinion $h^3$ and a bevel pinion $h^4$. The piece $g$, supports a second removable piece $i$, fixed in any desired manner, for example by means of two pins $i'$, engaging within suitable holes in the piece $g$, and held by screws $i^2$. The piece $i$, supports a vertical shaft $k$, upon which is keyed a bevel pinion $k'$, engaging with the bevel pinion $h^4$. A chuck $k^2$, is mounted on the shaft $k'$ and in which is fixed the tool to be used, for example the drill $k^3$, countersink or the like. A crank $l$, extensible in order to permit of increased leverage, is keyed on the shaft $e'$, the crank imparting, by a chain $l'$, passing over the sprocket pinions $e^2$ and $h^3$, a rotary movement to the horizontal shaft $h$, that is to the grinding wheel $h'$, the saw $h^2$, and the drill or countersink $k^3$ by the intermediary of the bevel pinions $k'$ and $h^4$. All the driving gear for the rotary movement is thus self-contained with the vertical tube $e$. A descending movement is given to the tube, and all the members carried upon it, by means of a lever $d^2$, operating the rack $e^3$, by the pinion or toothed sector $d'$, in such a manner as to bring the different tools into contact with the pieces of work carried by the vice, at the same time that the rotary movement of the tools is effected by the crank $l$.

When the operator releases the controlling lever $d^2$ the coiled spring $f$, automatically returns the tube $e$, upwards, in such a manner as to leave the pieces of work free. A vice $m$, slides in the base plate $a$ so that it can be removed therefrom. It has a stationary jaw $m^2$ and a movable jaw $m^3$, which is moved by a screw $m^4$ carried by a lug $m^5$ which is drilled and screw threaded to receive it. The vice can thus be withdrawn from the base plate $a$, of the machine, with a piece of work still gripped in it between the jaws $m^2$, $m^3$, and similarly a piece of work can be placed in and gripped by the vice before the vice is placed in position on the base plate $a$. It is secured in position by a set screw $m'$. In order to facilitate centering of the piece of work in the vice, each of the jaws of the latter has two axial V grooves $n$, $n'$, at right angles to each other.

The body of the machine tool may be raised, lowered and set in any desired position, the set screw $c'$ enabling the body $c$ to be fixed on the column $b$ in any desired position, the machine consequently permitting working on pieces of widely varying dimensions and at different angles. The machine tool may be used for drilling, grinding, sawing, or equally for turning, mortising, countersinking or the like. By removing the body of the machine the vice is rendered available for holding work to be filed or otherwise worked upon by hand tools.

I claim:—

1. A hand operated universal machine tool comprising a plurality of shafts, tools on said shafts, driving mechanism for rotating said shafts, a tubular carrier for said shafts and driving mechanism, a base plate having a column fixed thereon, a body slidable and rotatable on said column, means for fixing said body in adjusted position on said column, rack teeth on said tubular carrier, a pinion on said body and meshing with said rack teeth, means for rotating said pinion, and a coiled spring within said tubular carrier and having an abutment on said body for raising said carrier relatively to said body, substantially as and for the purposes hereinbefore set forth.

2. A hand operated universal machine tool comprising a carrier having a plurality of shafts fitted with tools, a base plate having a column fixed thereon, a body adjustably mounted on said column, means, carried by the said carrier, for rotating said shafts, means for raising and lowering said carrier relatively to said body, and a removable vice on said base plate, said vice having jaws the opposing faces of which each have two V grooves arranged at right angles to each other, for the purpose hereinbefore set forth.

3. A hand operated universal machine tool comprising a vertical tubular carrier, two shafts, one vertical and the other horizontal, carried by the lower end of said tubular carrier, a horizontal shaft, having a sprocket pinion and a hand crank, mounted on the upper end of said tubular carrier, a sprocket pinion on the horizontal shaft carried on the lower end of said tubular carrier, a chain connecting said sprocket pinions, a base plate having a vertical column fixed thereon, a body rotatable and slidable vertically on said column, rack and pinion mechanism for lowering said tubular carrier relatively to said body, and a spring for automatically raising said carrier relatively to said body, substantially as and for the purpose hereinbefore set forth.

In testimony whereof I have signed my name to this specification in the presence of two subscribing witnesses.

MATHIEU LINOTTE.

Witnesses:
EMILE BERTRAND,
CHAS. P. PRESSLY.